(12) United States Patent
Jeong et al.

(10) Patent No.: US 6,654,121 B1
(45) Date of Patent: Nov. 25, 2003

(54) APPARATUS AND METHOD FOR DETECTING POLARIZATION

(75) Inventors: Ho Jin Jeong, Taejon (KR); Bong Wan Lee, Taejon (KR)

(73) Assignee: Donam Systems Inc. (KR)

( * ) Notice: Subject to any disclaimer, the term of this patent is extended or adjusted under 35 U.S.C. 154(b) by 116 days.

(21) Appl. No.: 09/913,123

(22) PCT Filed: Oct. 6, 2000

(86) PCT No.: PCT/KR00/01112
§ 371 (c)(1),
(2), (4) Date: Aug. 8, 2001

(87) PCT Pub. No.: WO01/42749
PCT Pub. Date: Jun. 14, 2001

(30) Foreign Application Priority Data
Dec. 8, 1999 (KR) .................................... 1999-55885

(51) Int. Cl.[7] ................................................ G01J 4/00
(52) U.S. Cl. ...................................... 356/369; 356/364
(58) Field of Search ................................ 356/364–370

(56) References Cited

U.S. PATENT DOCUMENTS

| | | | | |
|---|---|---|---|---|
| 4,960,319 A | | 10/1990 | Dankowych | 350/96.29 |
| 5,005,977 A | * | 4/1991 | Tomoff | 356/367 |
| 5,247,176 A | * | 9/1993 | Goldstein | 250/338.1 |
| 5,396,329 A | * | 3/1995 | Kalawsky | 356/364 |
| 5,519,493 A | * | 5/1996 | Reiley | 356/367 |
| 5,659,412 A | | 8/1997 | Hakki | 359/156 |
| 6,396,575 B1 | * | 5/2002 | Holland | 356/73.1 |

FOREIGN PATENT DOCUMENTS

| | | |
|---|---|---|
| JP | 63-055519 | 3/1988 |
| JP | 2-250026 A | 10/1990 |

OTHER PUBLICATIONS

English–language abstract of JP2–250026 A.
English–language abstract of JP63–055519.

* cited by examiner

*Primary Examiner*—Michael P. Stafira
(74) *Attorney, Agent, or Firm*—Marger Johnson & McCollom, P.C.

(57) ABSTRACT

An apparatus and method for detecting the state of polarization (SOP). The apparatus of the present invention includes a phase retarder and a polarizer which rotate with different speeds. In the method of the present invention, optical signals passed through the rotating phase retarder and the rotating polarizer are detected and their harmonic components related to rotating frequencies of phase retarder and polarizer are analyzed, which gives the Stokes parameters representing the state of polarization. According to the present invention, the amount of phase retardation at the phase retarder can be obtained together with the state of polarization using frequency component analysis, reducing measurement errors. The present invention has advantages in SOP measurement of wide wavelength range, increasing the measurement accuracy.

12 Claims, 3 Drawing Sheets

APPARATUS AND METHOD FOR DETECTING POLARIZATION

TECHNICAL FIELD

The present invention relates to an apparatus and a method for detecting the state of polarization (SOP) of light.

BACKGROUND ART

There are various ways of describing polarization of light, among which the Stokes parameter method is representative. The Stokes parameters are comprised of four elements, i.e., $S_0$, $S_1$, $S_2$ and $S_3$. $S_0$ is the total intensity of light, $S_1$ is the intensity of 0-degree linear polarization minus the intensity of 90-degree linear polarization, $S_2$ is the intensity of 45-degree linear polarization minus the intensity of −45-degree linear polarization, $S_3$ is the intensity of right-hand circular polarization minus the intensity of left-hand circular polarization. When the incident light E(t) is expressed as in Equation 1 below, the Stokes parameters can be obtained by Equation 2 below:

$$E(t) = \hat{x} E_x(t) e^{i\phi^x(t)} + \hat{y} E_y(t) e^{-i\phi^y(t)} \quad \text{Equation 1,}$$

where both $E_x$ and $E_y$ are real numbers; and $$S_0 = \langle E_x^2 \rangle + \langle E_y^2 \rangle$$

$$S_1 = \langle E_x^2 \rangle - \langle E_y^2 \rangle$$

$$S_3 = \langle 2 E_x E_y \cos \eta \rangle$$

$$S_4 = \langle 2 E_x E_y \sin \eta \rangle \quad \text{Equation 2,}$$

where $\eta = \phi_x - \phi_y$, and $\langle \rangle$ is time average.

The method of measuring the Stokes parameters can be divided into two types, i.e., the space division measurement method and the time division measurement method.

FIG. 1 is a diagram illustrating the space division measurement method.

Referring to FIG. 1, a first photo detector 30a measures the total intensity lo of the light coming out of a 4-way beam splitter 10 without a polarizer. In this manner, a linear polarizer 20a is aligned at a 0-degree direction in front of a second photo detector 30b, and a linear polarizer 20b is aligned at a 45-degree direction in front of a third photo detector 30c. In this manner, the second and third photo detectors 30b and 30c measure the intensities of the respective linear polarization components $I_1$ and $I_2$ of each direction. A fourth photo detector 30d measures the intensity $I_3$ of the light that has propagated through the 1/4 wavelength phase retarder 15 aligned at a 45-degree direction and a linear polarizer 20c aligned at a 0-degree direction. The intensity $I_3$ corresponds to the intensity of the right-hand circular polarization. The measured intensities $I_0$, $I_1$, $I_2$, and $I_3$ have a relationship with the Stokes parameter as follows:

$$S_0 = I_0$$

$$S_1 = 2I_1 - I_0$$

$$S_2 = 2I_2 - I_0$$

$$S_2 = 2I_2 - I_0 \quad \text{Equation 3.}$$

According to the method illustrated in FIG. 1, the measurement can be done rapidly because light is equally divided into four components and measured at the same time by use of four photo detectors. However, the apparatus is complicated and the sensitivity can vary with photo detectors, because four photo detectors are used.

FIG. 2 is a diagram illustrating the time division measurement method. Referring to FIG. 2, a phase retarder 200 and a polarizer 210 which are capable of rotation to a certain angle are located sequentially in front of a photo detector 220. By adjusting the angle, it is possible to measure the light intensities $I_0$, $I_1$, $I_2$, and $I_3$ that have a relation with the Stokes parameters as illustrated in Equation 3. However, this method has a disadvantage that the relative angle between the phase retarder 200 and the polarizer 210 must be very precisely controlled.

The above-illustrated space division or time division measurement methods are capable of modification. However, the disadvantage of these methods is that they use a 1/4 wavelength retarder as the phase retarder in which error easily occurs, because the amount of retardation is a function of wavelength.

DISCLOSURE OF THE INVENTION

Therefore, it is an object of the present invention is to provide an apparatus for detecting polarization with a simplified structure.

It is another object of the present invention to provide a method for detecting polarization with an enhanced speed.

It is still another object of the present invention to provide a method of detecting the state of polarization of light in a wide range of wavelength by reducing errors in detecting the state of polarization. In particular, it is the object of the present invention to reduce the measurement error arising from the change in the amount of phase retardation with respect to the wavelength in the phase retardation plate.

To this end, an apparatus for detecting polarization is provided, the apparatus comprising a phase retarder rotating at a first constant speed for causing phase retardation between polarization components of an incident light with respect to a fast axis and a slow axis of the phase retarder, a polarizer rotating at a second constant speed for changing a state of polarization of light that propagated through the phase retarder, a detector for detecting an intensity of light that propagated through the polarizer, and a signal processing unit for deriving frequency components of electrical signals of light that was detected at the detector to analyze the state of polarization of the incident light.

Preferably, the phase retarder is a 1/4 wavelength plate.

The method of detecting a state of polarization of an incident light according to the present invention comprises the steps of periodically changing the state of polarization of polarization components of the incident light by propagating the incident light through a phase retarder that has a fast axis and a slow axis and rotates at a first constant speed, changing an intensity of the incident light by propagating the incident light of which the state of polarization was changed through a polarizer rotating at a second constant speed, detecting the changed intensity of the incident light, and deriving frequency components from the detected intensity of the incident light to obtain Stokes parameters.

Preferably, the first constant speed and the second constant speed are different from each other. Alternatively, the first constant speed and the second constant speed may have same magnitudes but opposite directions.

Still alternatively, the first constant speed and the second constant speed may have same directions and the ratio of a magnitude of the first constant speed to a magnitude of the second constant speed may range from 1/3 to 3/1.

BEST MODE FOR CARRYING OUT THE INVENTION

The rotation matrix $R(\theta)$ representing a rotation of an angle $\theta$ in a two-dimensional plane can be expressed as in Equation 4:

$$R(\theta) = \begin{pmatrix} \cos\theta & -\sin\theta \\ \sin\theta & \cos\theta \end{pmatrix}. \qquad \text{Equation 4}$$

The matrix $W(0)$ for the phase retarder, in which the phase difference between the slow axis and the fast axis is $2\phi$ and the slow axis is directed to x polarization, can be expressed as in Equation 5:

$$W(0) = \begin{pmatrix} e^{i\phi} & 0 \\ 0 & e^{-i\phi} \end{pmatrix}. \qquad \text{Equation 5}$$

The matrix $W(0)$ for the phase retarder, in which the phase difference between the slow axis and the fast axis is $2\phi$ and the slow axis is rotated by $\theta$, can be expressed as in Equation 6:

$$W(\theta) = \qquad \text{Equation 6}$$

$$R(\theta)W(0)R(-\theta) = \begin{pmatrix} \cos\phi + i\cos 2\theta \sin\phi & i\sin 2\theta \sin\phi \\ i\sin 2\theta \sin\phi & \cos\phi - i\cos 2\theta \sin\phi \end{pmatrix}.$$

The matrix $P(0)$ for a polarizer in which the transmission polarization is x-polarization can be expressed as in Equation 7:

$$P(0) = \begin{pmatrix} 1 & 0 \\ 0 & 0 \end{pmatrix}. \qquad \text{Equation 7}$$

The matrix $P(\theta)$ for a polarizer in which the transmission polarization is rotated by $\theta$ can be expressed as in Equation 8:

$$P(\theta) = R(\theta)P(0)R(-\theta) = P(0) = \frac{1}{2}\begin{pmatrix} 1+\cos 2\theta & \sin 2\theta \\ \sin 2\theta & 1-\cos 2\theta \end{pmatrix}. \qquad \text{Equation 8}$$

The Jones vector E representing any given input polarization can be expressed as in Equation 9:

$$E = \begin{pmatrix} E_x e^{i\eta/2} \\ E_y e^{-i\eta/2} \end{pmatrix}, \qquad \text{Equation 9}$$

where $E_x$ and $E_y$ are real numbers.

When the phase retarders are in the $\theta_w$ and $\theta_P$ direction, respectively, the intensity I of the light subsequent to propagating through these phase retarders can be expressed as in Equation 10:

$$2I = 2E^*W^*(\theta_w)P^*(\theta_p)P(\theta_p)W(\theta_w)E$$

$$= E_x^2 + E_y^2$$

$$+ 2E_x E_y \sin\eta \sin 2\phi \sin(2\theta_w - 2\theta_p) \qquad \text{Equation 10}$$

$$+ 2E_x E_y \cos\eta \cos^2\phi \sin 2\theta_p + (E_x^2 - E_y^2)\cos^2\phi \cos 2\theta_p$$

$$+ E_x E_y \cos\eta \sin^2\phi \sin(4\theta_w - 2\theta_p) + (E_x^2 - E_y^2)\sin^{2\phi\, \cos} 4\theta_w - 2\theta_p)$$

The preferred embodiments of the present invention are described below by referring to the attached drawings.

Figure 1:
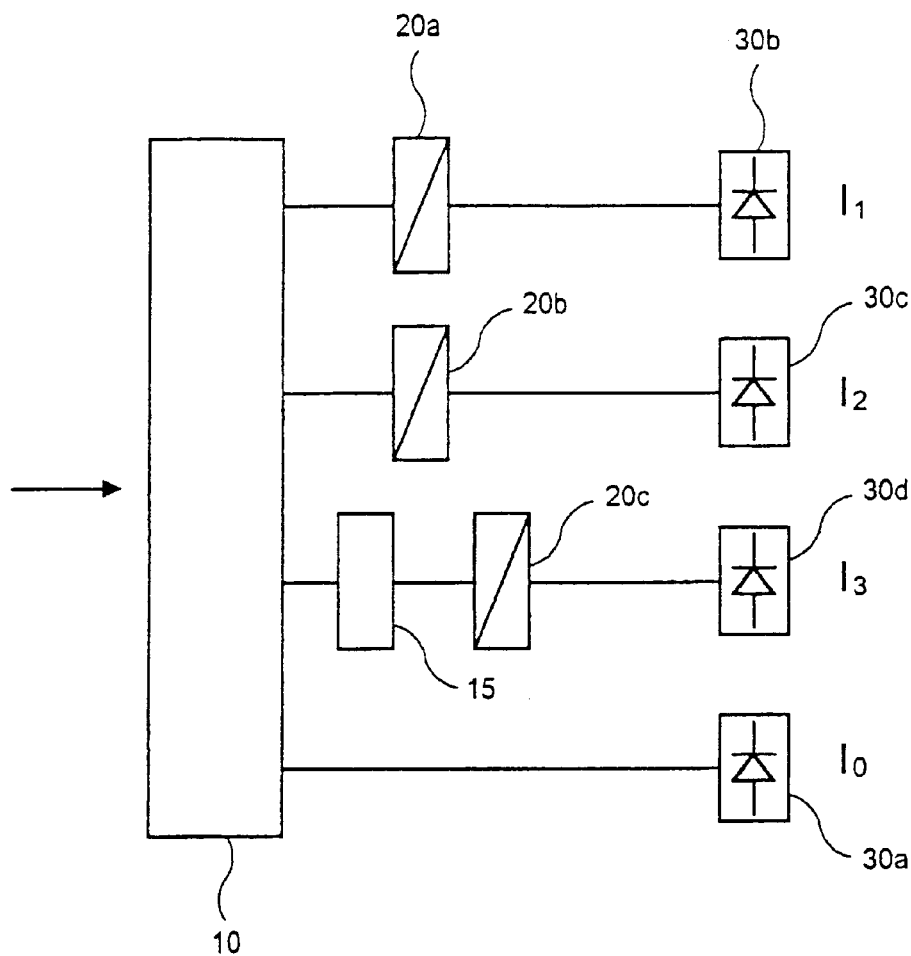
FIG. 1 is a diagram for illustrating an apparatus employing the space division measurement method.
Figure 2:
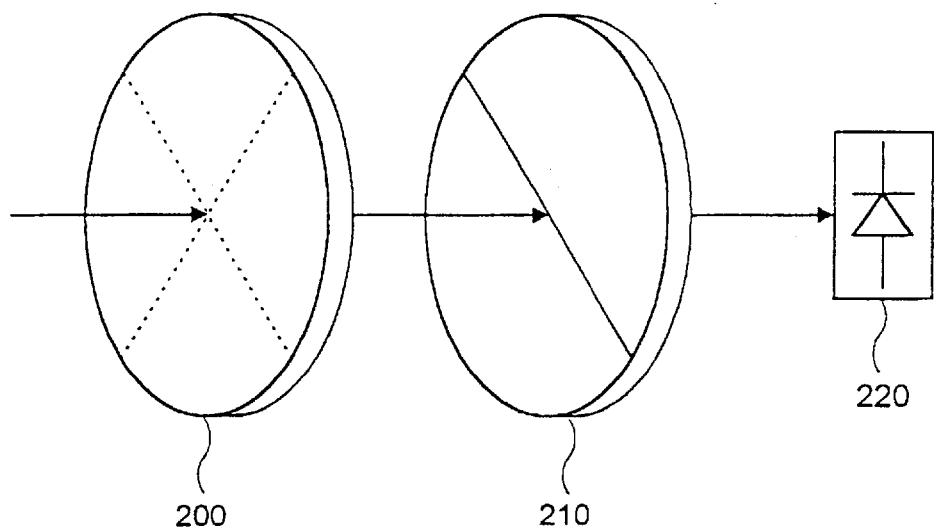
FIG. 2 is a diagram for illustrating the time division measurement method.
Figure 3:
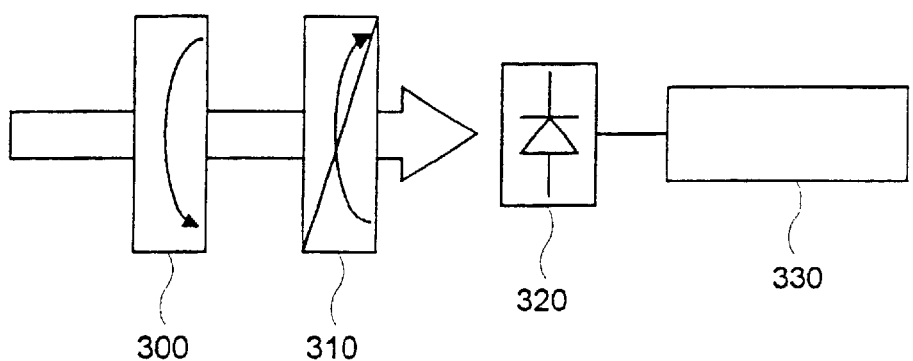
FIG. 3 is a schematic diagram of the apparatus for detecting polarization according to an embodiment of the present invention.

FIG. 3 is a schematic diagram of the apparatus for detecting polarization according to an embodiment of the present invention. Referring to FIG. 3, the incident light sequentially propagates through a phase retarder 300 rotating at a first constant speed in one direction, a polarizer 310 rotating at a second constant speed in an opposite direction, a detector 320, and a signal processing unit 330. The phase retarder 300 generates a phase difference between the polarized components that are incident in the directions of the fast and slow axes. This phase difference causes change in the state of polarization of the light that has propagated through the phase retarder 300. Therefore, if the phase retarder 300 rotates at a constant speed, the state of polarization of the light likewise changes periodically.

Figure 4:
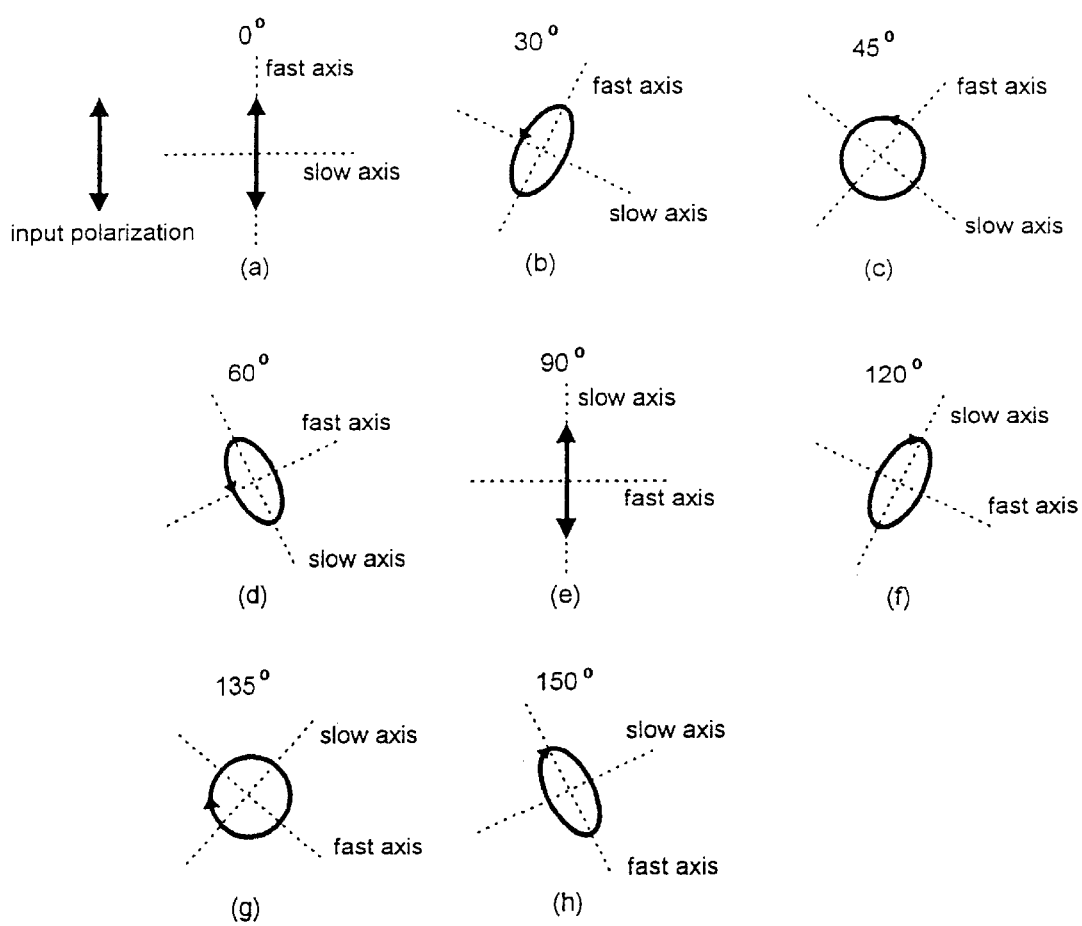
FIG. 4 is a diagram illustrating how the state of output polarization changes according to the angle between the incident light linearly polarized with respect to the 1/4 wavelength phase retarder and the fast axis.

FIG. 4 is a diagram illustrating how the state of output polarization changes according to the angle between the incident light linearly polarized with respect to the 1/4 wavelength phase retarder and the fast axis. When any given polarization component propagates through the polarizer, only the component corresponding to the transmission axis of the polarizer can pass through. The polarization component incident to the polarizer 310 shown in FIG. 3 has already gone through a change in the state of polarization by the rotation of the phase retarder 300. Thus, the intensity of light propagating through the polarizer 310 changes likewise. The intensity of the transmitted light with respect to any given angles $\theta_w$ and $\theta_p$ of the phase retarder and the polarizer, respectively, could be expressed as in Equation 10.

If the phase retarder 300 rotates at a frequency of $f_w$ and the polarizer 310 rotates at a frequency of $f_p$, i.e., $\theta_w = 2\pi f_w t$ and $\theta_p = 2\pi f_p t$, then the intensities $I_0$, $I_{f_w - f_p}$, $I_{f_p s}$, $I_{f_p c}$, $I_{2f_w - f_p's}$, $I_{2f_w - f_p c}$ of the direct component, $\sin 4\pi(2f_w - f_p)t$ component, $\sin 4\pi f_p t$ component, $\cos 4\pi f_p t$ component, $\sin 4\pi(2f_w - f_p)t$ component, and $\cos 4\pi(2f_w - f_p)t$ component, respectively, can be obtained as in Equation 11:

$$2I_0 = E_x^2 + E_y^2$$

$$2I_{f_w-f_p} = 2E_x E_y \sin \eta \sin 2\phi$$

$$2I_{f_p s} = 2E_x E_y \cos \eta \cos^2 \phi$$

$$2I_{f_p c} = (E_x^2 - E_y^2)\cos^2 \phi \quad \text{Equation 11}$$

$$2I_{2f_w-f_p s} = 2E_x E_y \cos \eta \sin^2 \phi$$

$$2I_{2f_w-f_p c} = (E_x^2 - E_y^2)\sin^2 \phi$$

If the intensity of the unpolarized component is $I_{up}$ among the components of the incident light, then the intensity $I_0$ of the direct component changes as in Equation 12 below without any changes in the intensity of the other components:

$$2I_0 = E_x^2 + E_y^2 + I_{up} \quad \text{Equation 12}$$

If the components in Equations 11 and 12 are correlated with the Stokes parameters, then we obtain the relations as described in Equation 13:

$$S_0 = 2I_0$$

$$S_1 = 2I_{f_p c} + 2I_{2f_w-f_p s} \quad \text{Equation 13}$$

$$S_2 = 2I_{f_p s} + 2I_{2f_w-f_p s}$$

$$S_3 = 2I_{f_w-f_p}/\sin 2\phi$$

The method of detecting the state of polarization in the present invention is to measure the intensity of light while rotating the phase retarder and the polarizer at a frequency of $f_w$ and $f_p$, respectively, obtain respective frequency components of such measured intensity of light by Fourier transform, and use those frequency components in Equation 13 to obtain the Stokes parameters.

Note that sin 2φ in Equation 13 can be obtained by using $\tan^2 \phi$, which is the ratio of $I_{2f_w-f_p c}$ or the ratio of $I_{2f_w-f_p s}$ to $I_{f_p s}$, in Equation 14:

$$\sin 2\phi = \sqrt{1 - \left(\frac{1 - \tan^2 \phi}{1 + \tan^2 \phi}\right)^2}. \quad \text{Equation 14}$$

Thus, the present invention has an advantage that the amount of phase retardation in the phase retarder can be obtained by the measurement illustrated above, even though it is not known in advance. Because the amount of phase retardation in the phase retarder is a function of wavelength and thus changes with change in the wavelength, this means that the wavelength of the light source can be obtained by the measurement illustrated above without prior knowledge of the amount of phase retardation.

The angles of the polarizer and the phase retarder at initial time t=0 were both set at 0 degrees when deriving Equation 13. In general, it is inconvenient to set both angles at 0 degrees. Thus, if the initial time t=0 is set at the moment when the angle of the polarizer is 0 degrees and the initial angle of the phase retarder is set at any given angle $\theta_{w0}$, the information of this angle $\theta_{w0}$ can be derived from the components that are proportional to cos $4\pi(f_w-f_p)$t and sin $4\pi(f_w-f_p)$t. The modification of Equation 13 necessitated by the existence of this angle $\theta_{w0}$ can be easily done by a person skilled in the art.

INDUSTRIAL APPLICABILITY

Because only one phase retarder, one polarizer, and one photo detector are used in the apparatus of the present invention, the apparatus for detection of the status of polarization can be made in a small size at a low cost. Because it is not necessary to know the amount of phase retardation in the phase retarder in advance, it is possible to carry out measurement in a wide range of wavelength.

The present invention has an additional advantage that it is possible to obtain the angle of the phase retarder by initializing the measurement when the polarizer is at 0-degree angle, thus obviating the need to know the initial angle of the phase retarder in advance, whereas the angles of the phase retarder and the polarizer need to be precisely fixed in typical time division measurement methods.

Although the present invention has been illustrated with reference to embodiments of the present invention, various modifications are possible within the scope of the present invention by a person skilled in the art. Therefore, the scope of the present invention should be defined not by the illustrated embodiments but by the attached claims.

What is claimed is:

1. An apparatus for detecting polarization, the apparatus comprising:

a phase retarder rotating at a first constant speed for causing phase retardation between polarization components of an incident light with respect to a fast axis and a slow axis of the phase retarder;

a polarizer rotating at a second constant speed for changing a state of polarization of light that propagated through the phase retarder;

a detector for detecting an intensity of light propagated through the polarizer; and a signal processing unit for deriving frequency components of electrical signals of light that was detected at the detector to analyze the state of polarization of the incident light.

2. The apparatus for detecting polarization as claimed in claim 1, wherein the phase retarder is a 1/4 wavelength plate.

3. A method of detecting a state of polarization of an incident light, the method comprising:

periodically changing the state of polarization of polarization components of the incident light by propagating the incident light through a phase retarder that has a fast axis and slow axis and rotates at a first constant speed;

changing an intensity of the incident light by propagating the incident light of which the state of polarization was changed through a polarizer rotating at a second constant speed;

detecting the changed intensity of the incident light; and deriving frequency components from the detected intensity of the incident light to obtain Stokes parameters.

4. The method of detecting a state of polarization of an incident light as claimed in claim 3, wherein the first constant speed and the second constant speed have different magnitudes that are not harmonics of each other.

5. The method of detecting a state of polarization of an incident light as claimed in claim 3, wherein the first constant speed and the second constant speed have the same magnitudes but opposite directions.

6. The method of detecting a state of polarization of an incident light as claimed in claim 3, wherein the first constant speed and the second constant speed have the same directions and the ratio of a magnitude of the first constant speed to a magnitude of the second constant speed ranges from 1/3 to 3/1.

7. An apparatus structured to determine a polarization state of a light incident along an optic axis, the apparatus comprising:

a phase retarder disposed along the optic axis and rotating through a complete revolution at a first constant velocity;

a polarizer disposed along the optic axis and rotating through a complete revolution at a second constant velocity;

a detector structured to detect an intensity of the light after it propagates through the polarizer and structured to output an electrical signal; and a signal processing unit structured to analyze the polarization state by deriving a frequency component from the electrical signal.

8. The apparatus of claim 7, wherein the phase retarder is a quarter wavelength plate.

9. A method of detecting a polarization state of an incident light, the method comprising:

propagating the incident light through a phase retarder that rotates through multiple revolutions at a first constant velocity;

propagating the incident light through a polarizer that rotates through multiple revolutions at a second constant velocity;

detecting an intensity of the incident light;

deriving frequency components from the intensity of the incident light; and obtaining Stokes parameters of the incident light using the frequency components.

10. The method of claim 9, wherein the first constant velocity and the second constant velocity have different magnitudes that are not harmonics of the other.

11. The method of claim 10, wherein the first constant velocity and the second constant velocity have the same magnitudes but opposite directions.

12. The method of claim 9, wherein the first constant velocity and the second constant velocity have the same direction and a ratio of a magnitude of the first constant speed to a magnitude of the second constant speed ranges from 1/3 to 3/1.

* * * * *

UNITED STATES PATENT AND TRADEMARK OFFICE
CERTIFICATE OF CORRECTION

PATENT NO. : 6,654,121 B1
DATED : November 25, 2003
INVENTOR(S) : Jeong et al.

It is certified that error appears in the above-identified patent and that said Letters Patent is hereby corrected as shown below:

Column 1,
Line 25, " $E(t) = \hat{x} E_x(t) e^{i\phi_x(t)} + \hat{y} E_y(t) e^{-i\phi_y(t)}$ " should read -- $E(t) = \hat{x} E_x(t) e^{i\phi_x(t)} + \hat{y} E_y(t) e^{-i\phi_y(t)}$ --;

Line 36, "parameters can. be" should read -- parameters can be --;
Line 42, "intensity lo of the" should read -- intensity of the --;
Line 64, "$S_{2=}2I_2 I_0$" should read -- $S_{3=}2I_3 I_0$ --;

Column 2,
Line 9, "front of-a photo" should read -- front of a photo --;

Column 3,
Line 27, "rotation of. an" should read -- rotation of an --;

Column 4,
Line 26, " $+E_x E_y \cos \eta \sin^2 \Phi \sin(4\theta_w - 2\theta_p) + (E_x^2 - E_y^2)\sin^2\Phi \cos 4\theta_w - 2\theta_p)$ "
should read -- $+2E_x E_y \cos \eta \sin^2 \Phi \sin(4\theta_w - 2\theta_p) + (E_x^2 - E_y^2)\sin^2\Phi \cos(4\theta_w - 2\theta_p)$ --;

Line 63, " $I_o, I_{f_w - f_p}, I_{f_p,s}, I_{f_p,c}, I_{2f_w - f_p,s}, I_{2f_w - f_p,c}$ " should read -- $I_o, I_{f_w - f_p}, I_{f_p,s}, I_{f_p,c}, I_{2f_w - f_p,s}, I_{2f_w - f_p,c}$ --;

Line 64, "sin 4 $\pi$ (2f$_w$ - f$_p$)t component, sin $4\pi f_p$) t component" should read
-- sin 4 $\pi(f_w - f_p)t$ component, sin 4 $\pi f_p t$ componet --;

UNITED STATES PATENT AND TRADEMARK OFFICE
CERTIFICATE OF CORRECTION

PATENT NO.    : 6,654,121 B1
DATED         : November 25, 2003
INVENTOR(S)   : Jeong et al.

It is certified that error appears in the above-identified patent and that said Letters Patent is hereby corrected as shown below:

Column 5,
Line 47, "phase retardation in the phase" should read -- phase retardation 2Φ in the phase --;

Column 7,
Line 2, "directions and the" should read -- direction and the --.

Signed and Sealed this

Seventeenth Day of August, 2004

JON W. DUDAS
*Acting Director of the United States Patent and Trademark Office*